United States Patent [19]

Koyama

[11] Patent Number: 5,123,049
[45] Date of Patent: Jun. 16, 1992

[54] PATTERN RECOGNITION APPARATUS WITH RETRIEVAL REFERENCE PATTERNS

[75] Inventor: Motoaki Koyama, Yokohama, Japan

[73] Assignee: Kabushiki Kaisha Toshiba, Kawasaki, Japan

[21] Appl. No.: 507,503

[22] Filed: Apr. 11, 1990

[30] Foreign Application Priority Data

Apr. 13, 1989 [JP] Japan .................................. 1-93602

[51] Int. Cl.⁵ .............................................. G10L 5/06
[52] U.S. Cl. .......................................... 381/43; 381/41
[58] Field of Search .................................. 381/41–46; 364/513.5

[56] References Cited

U.S. PATENT DOCUMENTS

| | | | |
|---|---|---|---|
| 4,618,984 | 10/1986 | Das et al. | 381/43 |
| 4,827,520 | 5/1989 | Zeinstra | 381/43 |
| 4,829,577 | 5/1989 | Kuroda et al. | 381/43 |
| 4,933,973 | 6/1990 | Porter | 381/43 |

*Primary Examiner*—Dale M. Shaw
*Assistant Examiner*—Michelle Doerrler
*Attorney, Agent, or Firm*—Finnegan, Henderson, Farabow, Garrett and Dunner

[57] ABSTRACT

A pattern recognition apparatus includes a pattern memory unit for storing a pattern set constituted by a plurality of reference patterns and a comparison unit for comparing an input pattern with each reference pattern stored in the pattern memory unit in the recognition mode. In the pattern recognition apparatus, the pattern memory unit includes first and second pattern memory sections, a switch is provided to select one of the first and second pattern memory sections, the comparison unit is constituted to compare the input pattern with a desired reference pattern stored in one of the pattern memory sections which is selected by the switch in the registration mode, and a pattern modifying unit is provided to copy the pattern set stored in one of the pattern memory sections which is selected by the switch into the other pattern memory section in the registration mode, and modify the desired reference pattern in one of the first and second pattern memory sections according to the comparison result obtained from the comparison unit.

7 Claims, 4 Drawing Sheets

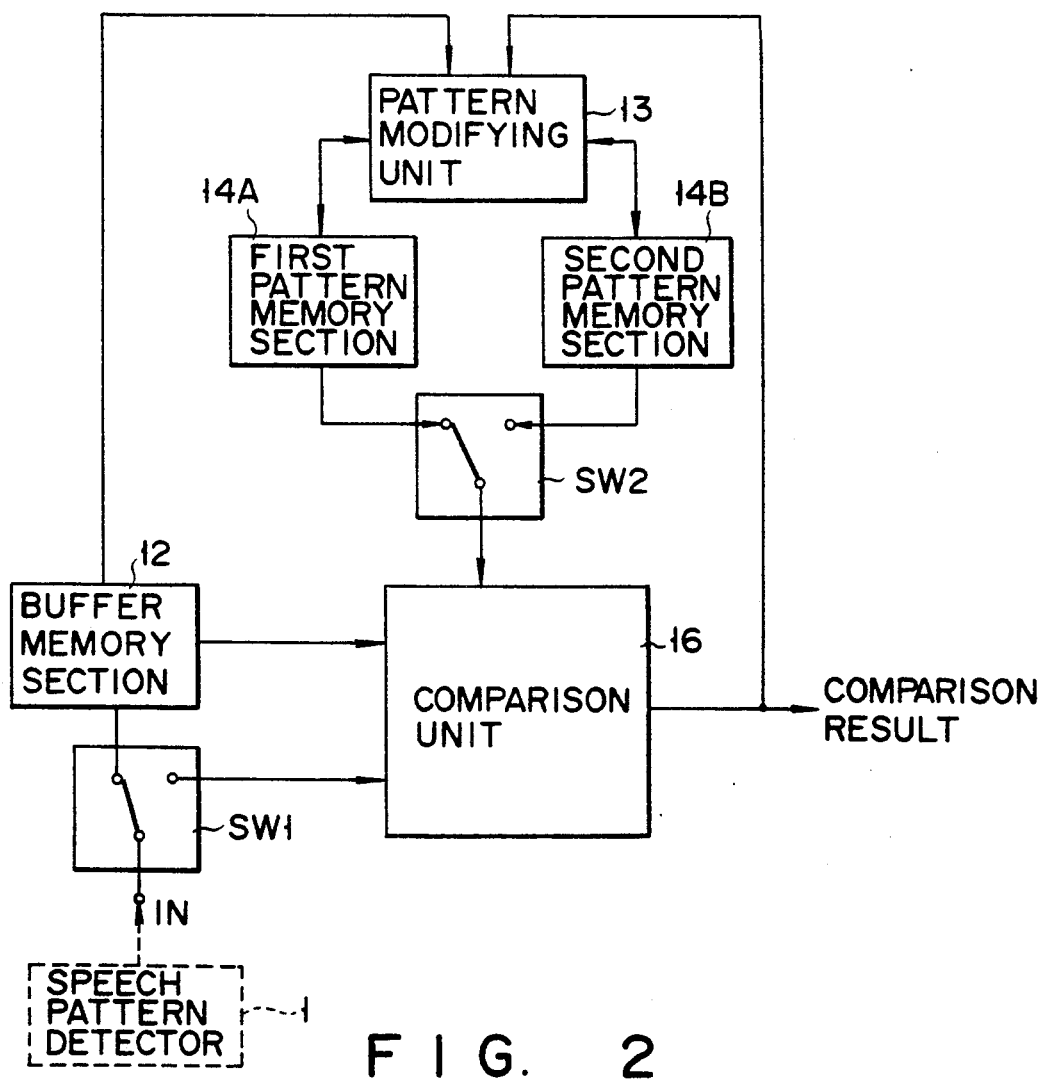
F I G. 2

5,123,049

PATTERN RECOGNITION APPARATUS WITH RETRIEVAL REFERENCE PATTERNS

BACKGROUND OF THE INVENTION

1. Field of the Invention

This invention relates to a pattern recognition apparatus, and more particularly to a pattern recognition apparatus having a registration mode in which a pattern used as a recognition reference is registered.

2. Description of the Related Art

FIG. 1 shows an example of a conventional speech recognition system designed for a small number of non-specified speakers. The speech recognition system includes a speech pattern detection section 1 for frequency-analyzing input speech and for detecting a characteristic speech pattern thereof, and a pattern recognition apparatus 2 for recognizing the speech pattern input from the speech pattern detection section. The pattern recognition apparatus 2 includes a pattern memory section 3 for storing a plurality of reference patterns, a comparing section 4 for recognizing the speech pattern from the speech pattern detection section 1 based on the similarity between the speech pattern and each of the reference patterns stored in the pattern memory section 3, and a switch for selectively connecting the speech pattern detection section 1 to one of the pattern memory section 3 and the comparing section 4.

In the registration mode, a speech pattern is supplied from the speech pattern detector 1 to the pattern memory section 3 via the switch and registered into the pattern memory as a recognition pattern. On the other hand, in the recognition mode, a speech pattern is supplied from the speech pattern detector 1 to the comparing section 4 via the switch and then compared with a plurality of reference patterns registered in the pattern memory section 3.

In a case where a plurality of speech patterns of a specified speaker are registered as recognition patterns in the pattern memory, it becomes difficult to attain a high rate of pattern recognition for a non-specified speaker. If additional recognition patterns are registered into the pattern memory section 3 and consequently the number of speech patterns to be recognized is increased, the difference between the reference patterns becomes small so that the pattern recognition rate may be lowered. For this reason, the recognition operation is effected in the recognition mode by using reference patterns registered in the pattern memory section 3 and some of the reference patterns are modified to correctly recognize speech patterns which are difficult to recognize, thus enhancing the recognition rate.

However, modification of the reference patterns cannot be always effected with good results, and sometimes the recognition rate may become lower than that which may be obtained without modification. In the conventional speech recognition system, a new speech pattern is written over the reference pattern which requires modification and the reference pattern is removed from the pattern memory. Therefore, if the modification is made in fail, the content of the pattern memory section cannot be returned to the state prior to the modification. For example, substantially the same reference pattern as that obtained before the modification can be registered into the pattern memory section by inputting a speech to the speech pattern detection section, but this needs a long time and much labor.

SUMMARY OF THE INVENTION

An object of this invention is to provide a pattern recognition apparatus in which an optimum reference pattern set can be easily obtained.

The above object can be attained by a pattern recognition apparatus comprising a plurality of memory sections for storing respective pattern sets each constituted by a plurality of reference patterns; a selection unit for selecting one of the pattern memory sections; a comparison unit for comparing an input pattern with each reference pattern stored in that one of the pattern memory sections which is selected by the selection unit in the recognition mode; and a pattern modifying unit for modifying a pattern read out from one of the pattern memory sections and storing the modified pattern set to another pattern memory section in the registration mode.

In the above pattern recognition apparatus, a reference pattern set is read out from one of the pattern memory sections, and stored into another pattern memory section with modification. Therefore, even if the modification of the reference pattern set is not adequately effected and the recognition rate becomes lower than before the modification, the original reference pattern set prior to the modification can be used for the recognition operation in the recognition mode. Further, the original reference pattern set can be modified again without effecting complex process. Therefore, with the pattern recognition apparatus of this invention, the optimum reference pattern set can be easily obtained.

BRIEF DESCRIPTION OF THE DRAWINGS

FIG. 2 is a diagram showing the construction of a pattern recognition apparatus according to one embodiment of the present invention;

DETAILED DESCRIPTION OF THE PREFERRED EMBODIMENT

Figure 1:
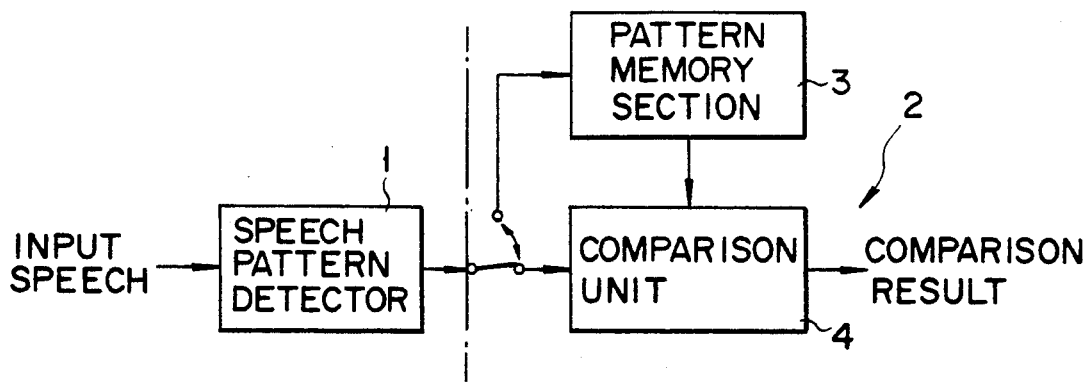
FIG. 1 is a diagram showing the construction of a conventional speech recognition system designed for a small number of non-specified speakers.
Figure 3:
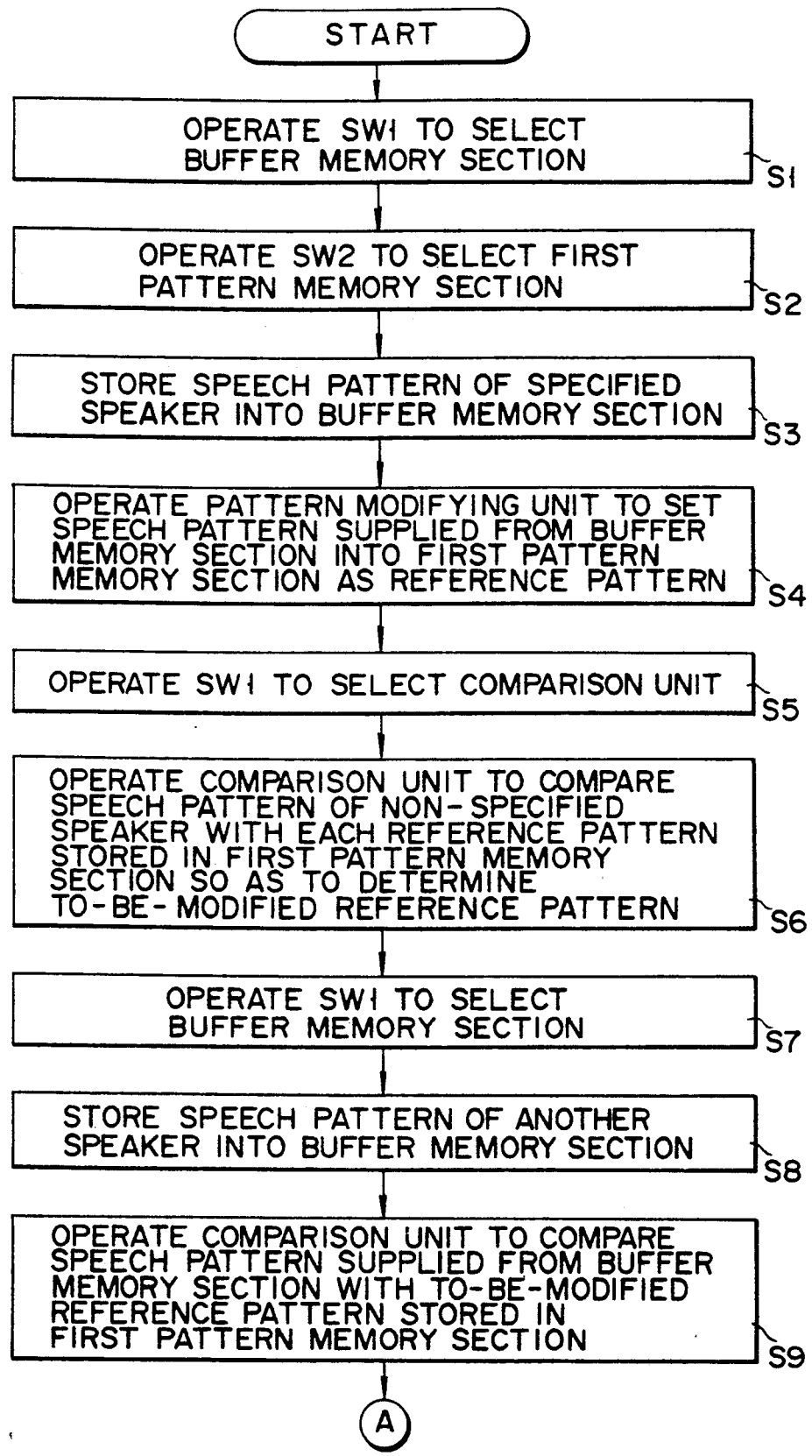
FIGS. 3 and 4 are flowcharts illustrating the operation of modifying the reference pattern into an optimum form in the pattern recognition apparatus of FIG. 2.
Figure 4:
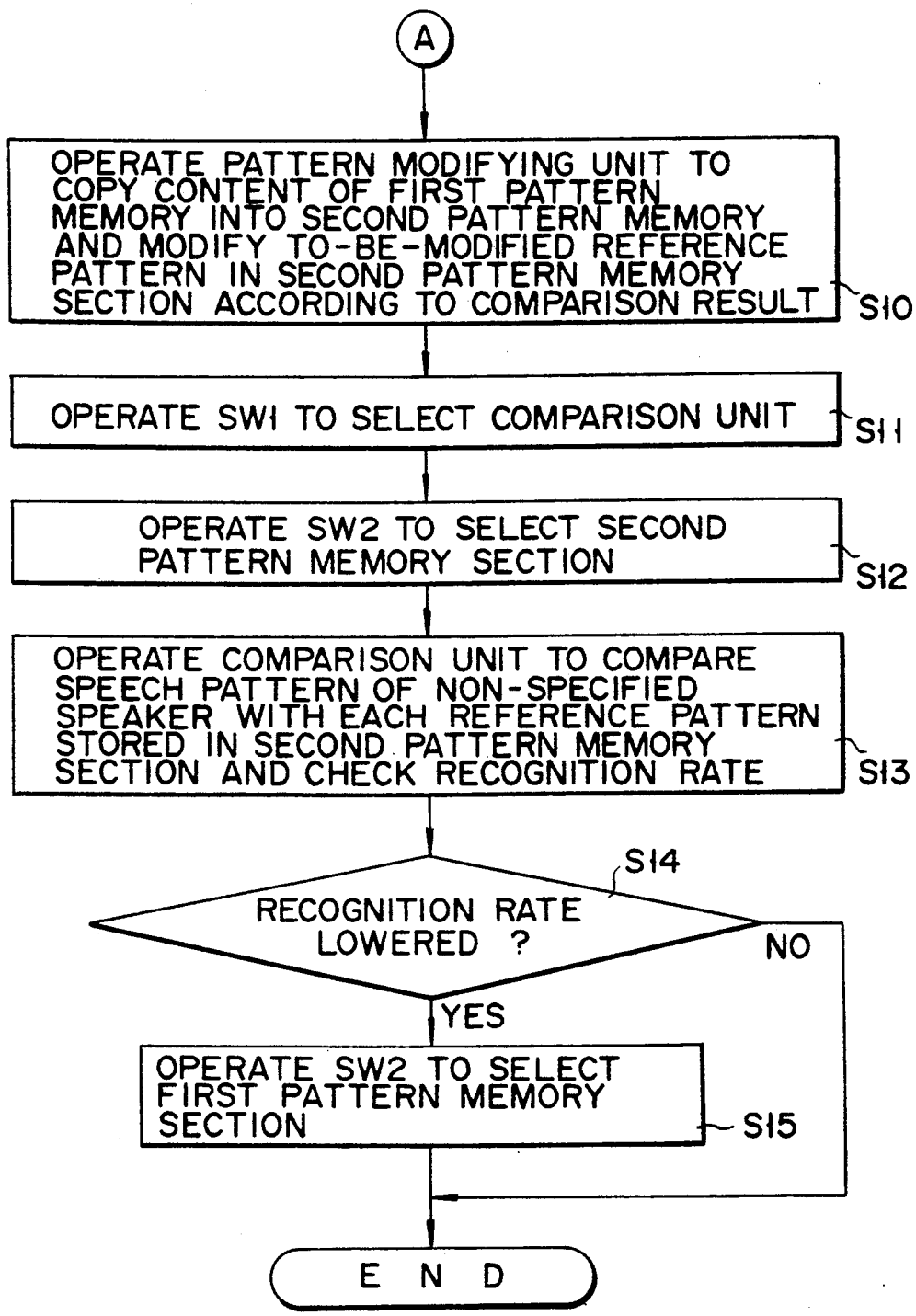

There will now be described a pattern recognition apparatus according to one embodiment of this invention with reference to FIGS. 2 to 4. The pattern recognition apparatus ma be used in such a speech recognition system as described above, for example.

FIG. 2 is a block diagram of the pattern recognition apparatus according to one embodiment of the present invention. The pattern recognition apparatus includes first and second switches SW1 and SW2, a buffer memory section 12, a pattern modifying unit 13, first and second pattern memory sections 14A and 14B, and a comparison unit 16. The switch SW1 is used to connect a input terminal IN to the buffer memory section 12 in the registration mode and to the comparison unit 16 in the recognition mode. The switch SW2 is used to selectively connect the comparison unit 16 to one of the pattern memory sections 14A and 14B in the registration or recognition mode. Speech patterns are supplied to the input terminal IN from a speech pattern detector 1, for example. The buffer memory section 12 stores each input speech pattern supplied from the input terminal IN via the switch SW1 in the registration mode, and supplies the same to the pattern modifying unit 13 and comparison unit 16. When a pattern set, comprising a plurality of reference patterns, is registered into one of the pattern memory sections 14A and 14B, the pattern modifying unit 13 stores speech patterns supplied from the buffer memory section 12 into a corresponding one of the pattern memory sections 14A, 14B as the reference patterns. The comparison unit 16 receives an input speech pattern supplied from the input terminal IN via the switch SW1 in the recognition mode, compares the input speech pattern with a plurality of reference patterns stored in one of the first and second pattern memory sections 14A and 14B which is connected thereto via the switch SW2, and recognizes one of the reference patterns which has the largest similarity as the input speech pattern. In a case where a reference pattern set stored in one of the first and second pattern memory sections 14A and 14B is modified in the registration mode, the comparison unit 16 receives a speech pattern supplied from the buffer memory section 12 and compare the speech pattern with the desired reference pattern stored in one of the first and second pattern memory sections 14A and 14B which is connected thereto via the switch SW2. The pattern modifying unit 13 reads out the pattern set containing the desired reference pattern from one of the pattern memory sections and stores the readout pattern set into the other pattern memory section, with the desired reference pattern being modified according to the comparison result from the comparison unit 16 or the difference between the compared speech patterns. In this case, the desired reference pattern is modified into a reference pattern which can be obtained by averaging the desired reference pattern and the speech pattern from the buffer memory section 12.

Next, the operation of optimizing the reference pattern in the pattern recognition apparatus is explained with reference to the flowchart shown in FIGS. 3 and 4.

Assume that no reference pattern is registered in the first and second pattern memory sections 14A and 14B. In this case, the switch SW1 is operated in step S1, shown in FIG. 3, to select the buffer memory section 12 and the switch SW2 is operated in step S2 to select one of the first and second pattern memory sections 14A and 14B, for example, the first pattern memory section 14A. Then, a plurality of speech patterns of a specified speaker are stored into the buffer memory section 12 via switch SW1 in step S3. The speech patterns are supplied to the pattern modifying unit 13 in step S4 but are not processed here and are stored as reference patterns in the pattern memory section 14A which was selected by the switch SW2 in step S2.

After this, switch SW1 is operated in step S5 to select the comparison unit 16. The comparison unit 16 then receives a speech pattern of a non-specified speaker supplied via switch SW1, and compares the speech pattern with the reference patterns stored in the pattern memory section 14A in step S6. As a result, a reference pattern corresponding to a speech pattern which is difficult to recognize is specified as an object to be modified. Then, switch SW1 is operated in step S7 to select the buffer memory section 12, and a speech pattern of another speaker is stored into the buffer memory section 12 in step S8. The comparison unit 16 compares the speech pattern supplied from the buffer memory section 12 with the to-be-modified reference pattern stored in the first pattern memory section 14A. The pattern modifying unit 13 copies the content of the first pattern memory section 14A into the second pattern memory section 14B, and modifies the to-be-modified reference pattern in the second pattern memory section 14B according to the comparison result in step S10, for example.

After this, the switch SW1 is operated in step S11 to select the comparison unit 16 and the switch SW2 is operated in step S12 to select the second pattern memory section 14B. The comparison unit 16 compares the speech pattern of the non-specified speaker with the reference patterns stored in the second pattern memory section 14B in step S13. If it is detected in step S14 that the pattern recognition rate is lowered as a result of the modification of the reference pattern, the switch SW2 is operated to select the first pattern memory section 14A instead of the second pattern memory section 14B. On the other hand, if it is detected that the pattern recognition rate is not lowered, the switching position of switch SW2 is kept unchanged to continuously select the second pattern memory section 14B. Further, in a case where it is required to modify the reference pattern stored in the second pattern memory section 14B, the content of the second pattern memory section 14B is copied into the first pattern memory section 14A and then the operation of modifying the reference pattern is effected.

In this embodiment, even in a case where the modification of the reference pattern fails and the pattern recognition rate is lower than before the modification, the modifying operation can be effected again without any trouble since the pattern set is also stored in the form obtained before it is subjected to the modification. Further, since a newly registered speech pattern is determined in the reference pattern registration operation after a difference between the input speech pattern and the registered speech pattern is detected, it becomes possible to set the recognition rate obtained after the modification equal to or higher than that obtained before the modification.

Figure 5:
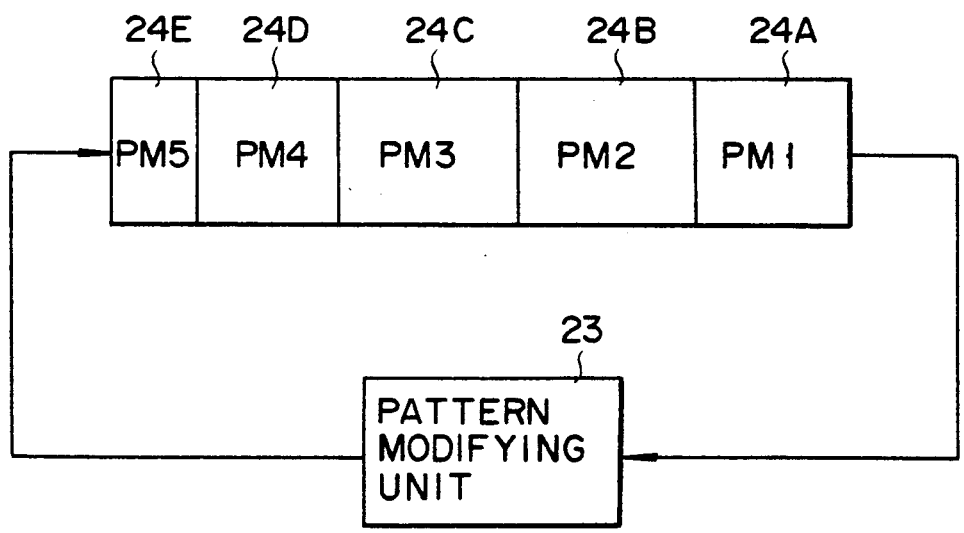
FIG. 5 is a diagram showing a modification of the pattern recognition apparatus shown in FIG. 2.

When a new reference pattern is simply added, the pattern modifying unit 13 copies the content of one of the pattern memory sections into the other pattern memory section and additionally stores the new reference pattern into the other pattern memory section. The number of the pattern memory sections can be set to three or more in order to hold the reference patterns obtained when two or more preceding modification cycles were effected. In this case, the switch SW3 is operated to select one of the pattern memory sections and connect the same to the comparison unit 16. Further, the pattern memory sections may be provided in a ring buffer configuration in a single chip as shown in FIG. 5, for example, instead of being provided separately. In this case, the switch SW2 can be replaced by a circuit for designating the address of the memory chip to select one of the pattern memory sections.

In the above embodiment, a speech pattern is supplied to the pattern recognition apparatus, but an image pattern such as letters and numerals ca be supplied to serve the same purpose.

What is claimed is:

1. A pattern recognition apparatus comprising:
   input means for receiving a plurality of input speech patterns;
   a plurality of pattern memory sections each for storing a set of reference speech patterns;

selection means for selecting one of said pattern memory sections;

recognition means, responsive to a first input speech pattern, for recognizing said first input speech pattern as being identical to one of said set of reference patterns stored in said selected pattern memory section which has the closest similarity to said first input speech pattern, in a recognition mode; and registration means, responsive to a second input speech pattern, for registering a new set of reference patterns in a registration mode, said registration means including modifying means for copying a reference pattern set stored in a first one of said pattern memory sections into a second one of said pattern memory sections and for modifying only said copied reference pattern set stored in said second pattern memory section, as the new reference pattern set.

2. A pattern recognition apparatus according to claim 1, wherein said registration means further includes buffer memory means for storing said second input speech pattern.

3. A pattern recognition apparatus according to claim 2, wherein said registration means further includes comparing means for performing a first comparison of said first input speech pattern with said reference pattern stored in said first one of said plurality of pattern memory sections, to determine a reference pattern to be modified, and for performing a second comparison of said second input speech pattern stored in said buffer memory means with said reference pattern to be modified.

4. A pattern recognition apparatus according to claim 3, wherein said modifying means includes a switching means for receiving one of said plurality of input speech patterns from the input means and for supplying the received input speech pattern to one of said buffer memory means and said comparing means.

5. A pattern recognition apparatus according to claim 3, wherein said modifying means includes a modifying unit for copying said reference pattern to be modified, as said reference set, into said second one of said pattern memory sections and for modifying said reference pattern to be modified according to said first and second comparisons.

6. A pattern recognition apparatus according to claim 5, wherein the modified reference pattern is an average speech pattern of a desired reference pattern and said second input speech pattern stored in said buffer memory means.

7. A pattern recognition apparatus according to claim 1, wherein said plurality of pattern memory sections are provided in a ring buffer configuration on a single memory chip, and said selection means includes a circuit for designating an address of said memory chip to select one of said plurality of pattern memory sections.

* * * * *